Aug. 15, 1939  J. J. N. VAN HAMERSVELD  2,169,749
MACHINE TOOL
Filed June 16, 1938  4 Sheets-Sheet 1
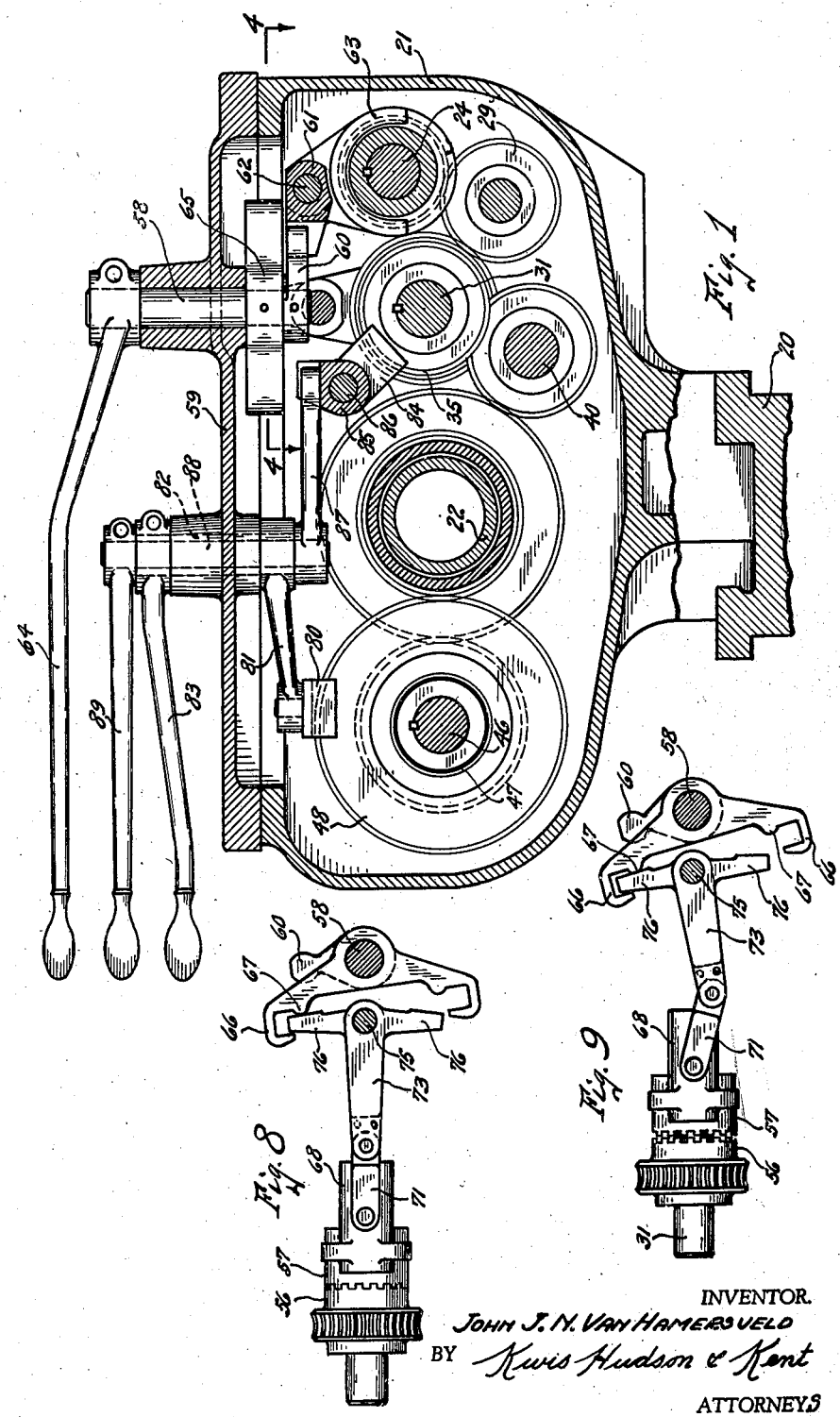
INVENTOR.
JOHN J. N. VAN HAMERSVELD
BY Kwis Hudson & Kent
ATTORNEYS Aug. 15, 1939. J. J. N. VAN HAMERSVELD 2,169,749
MACHINE TOOL
Filed June 16, 1938 4 Sheets-Sheet 2
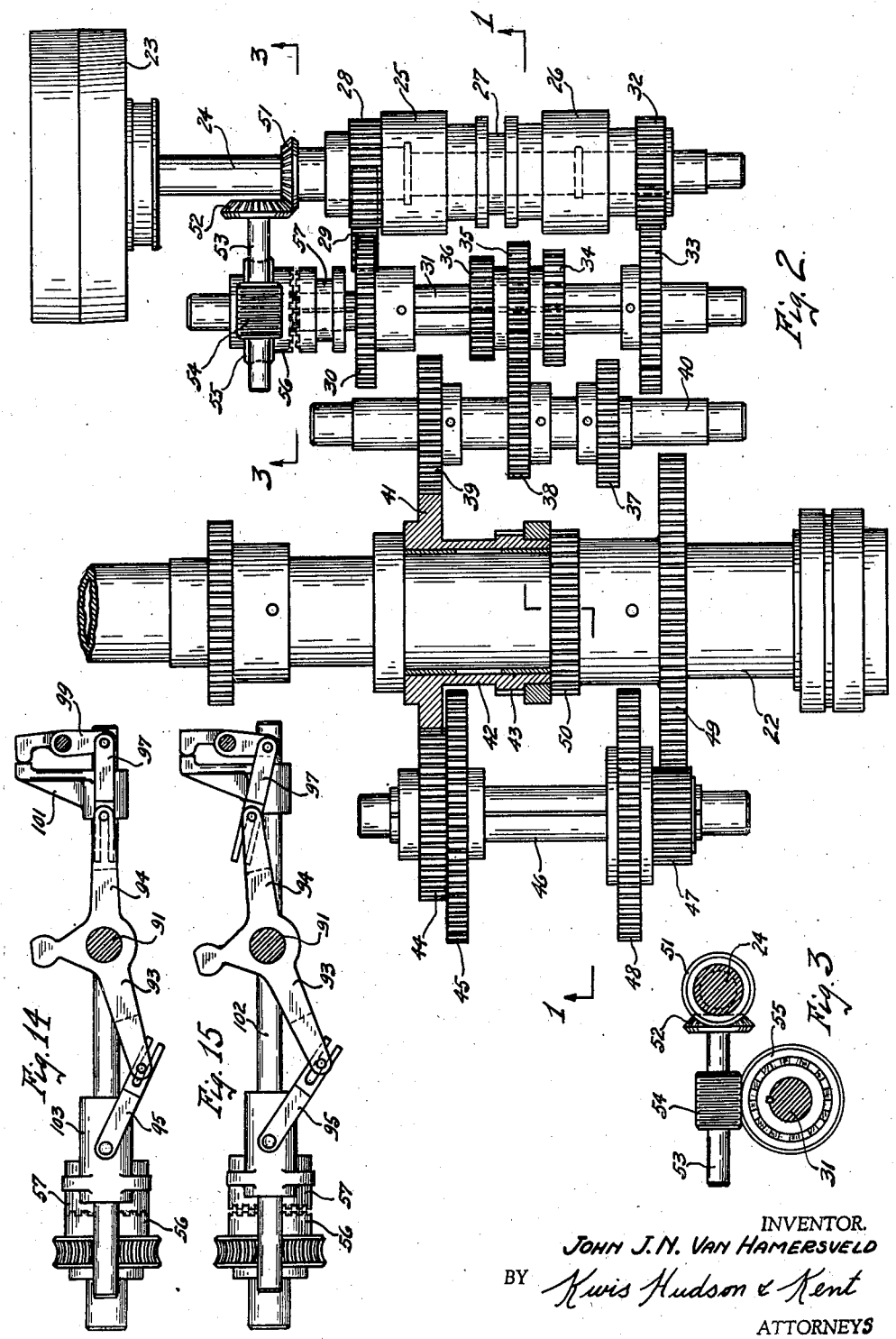
INVENTOR.
JOHN J. N. VAN HAMERSVELD
BY Kwis Hudson & Kent
ATTORNEYS

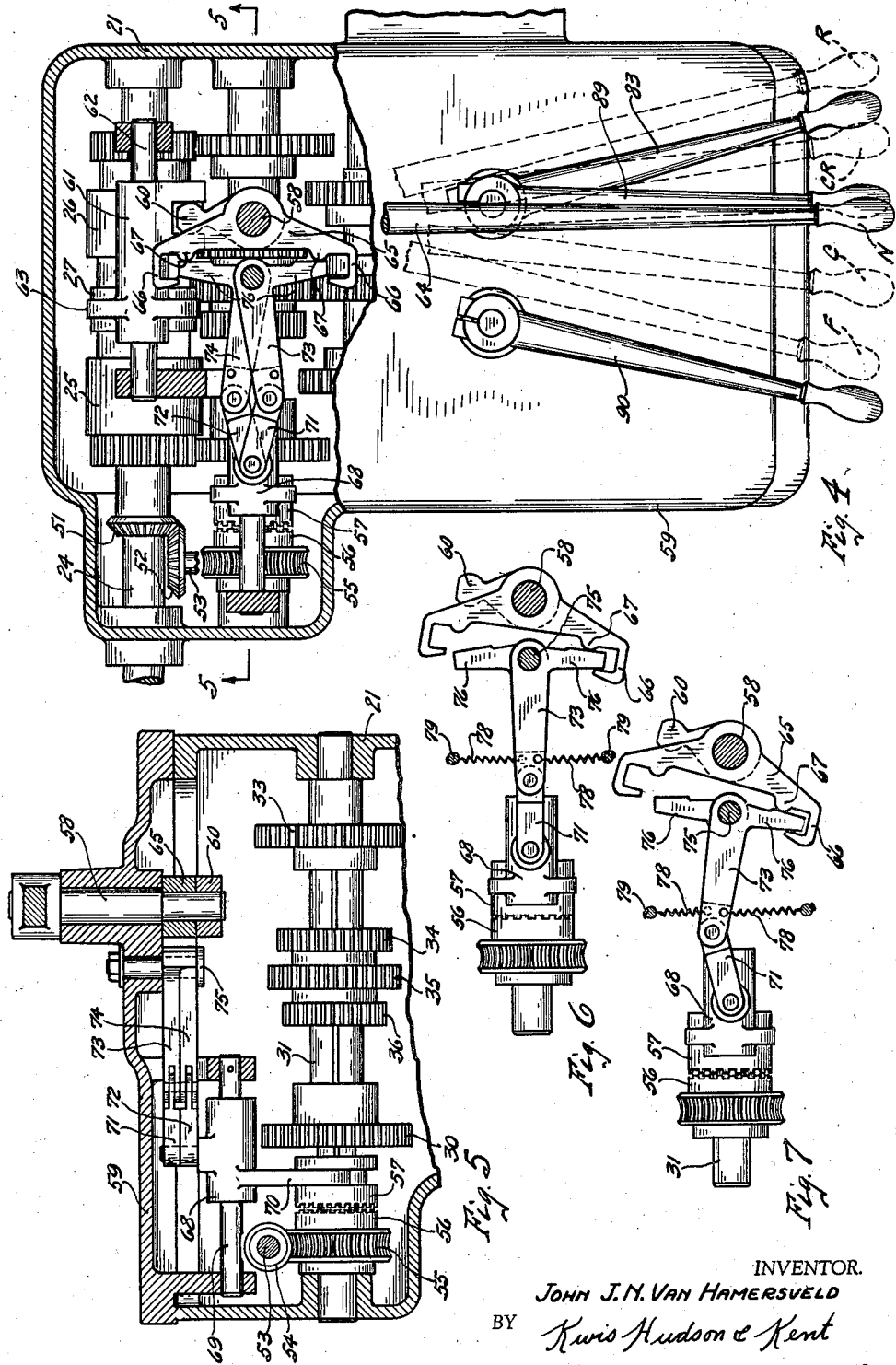

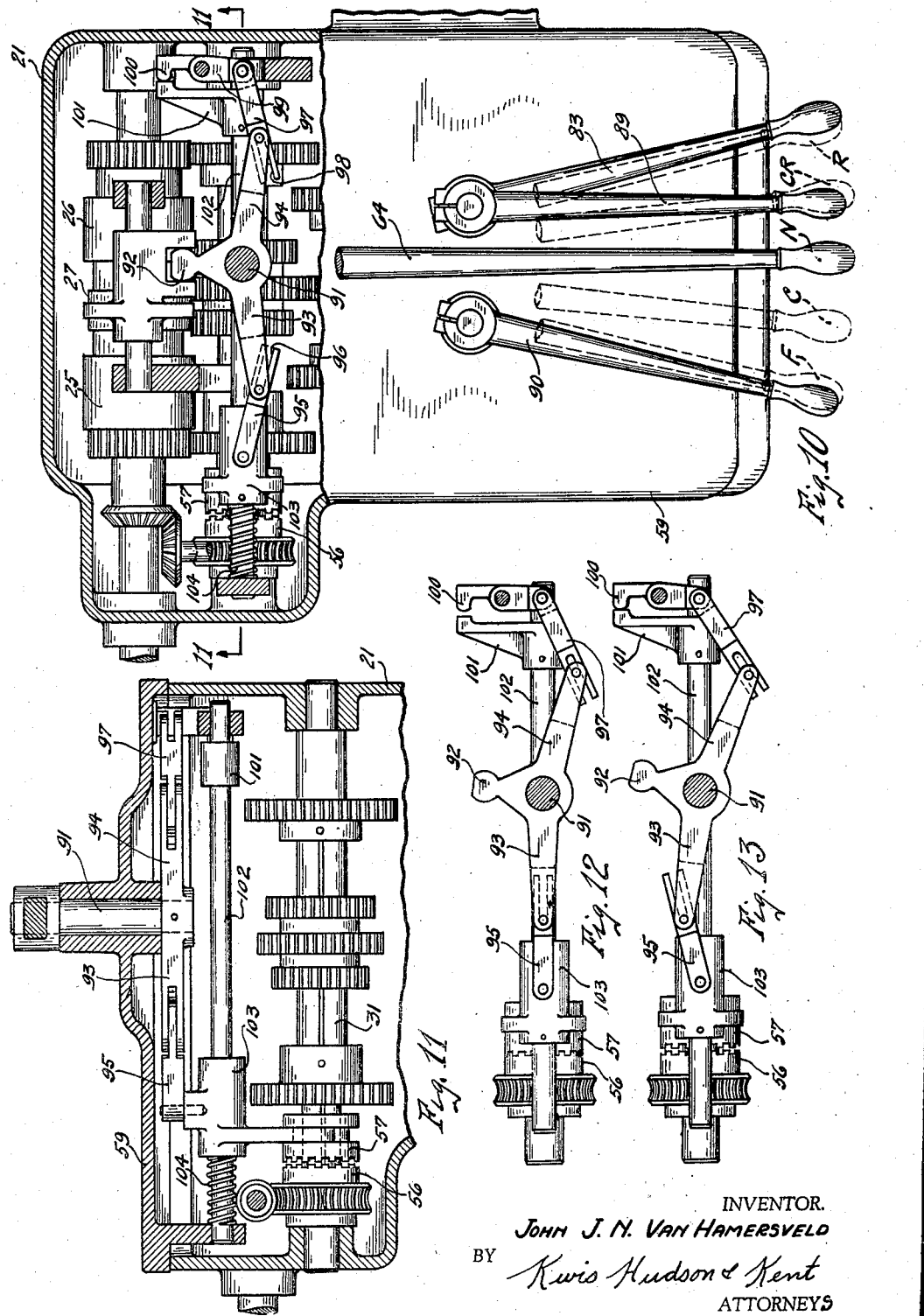

Patented Aug. 15, 1939

2,169,749

UNITED STATES PATENT OFFICE 2,169,749

MACHINE TOOL

John J. N. Van Hamersveld, Cleveland Heights, Ohio, assignor to The Warner & Swasey Company, Cleveland, Ohio, a corporation of Ohio Application June 16, 1938, Serial No. 214,036

12 Claims. (Cl. 82—29)

This invention relates to a machine tool and particularly to improved means for facilitating the shifting of the gearing in the transmission of a movable part of the machine tool. The invention by way of illustration will be described herein as applied to the head stock of a lathe.

This invention constitutes an improvement over that disclosed in the copending application of A. L. DeLeeuw, Serial No. 111,830, filed November 20, 1936, and the object of an invention is to provide, in a machine tool having a part to be moved at different rates and change speed gearing for changing the rate of movement of said part together with means for facilitating the shifting of said change speed gearing to vary the rate of said part, improved means for controlling the last named means and for controlling the engagement and disengagement of the main driving clutch.

A further and more specific object is to provide in a machine tool the mechanism referred to in the above named object, and wherein the control means for the main driving clutch and for the means for facilitating the shifting of the change speed gearing is so constructed that the manually operated control member thereof has the standard or conventional positions when the main driving clutch is engaged for forward or reverse drive or when it is in disengaged or neutral position, wherefore the operation of the machine is facilitated.

A further object is to provide in a machine tool having a movable part, change speed gearing for moving said part at different rates, a main driving clutch, and means for effecting a slow power driven movement of said change speed gearing to facilitate the shifting of the same, an improved control mechanism for said clutch and said means such that the single manually operated control member of said mechanism can be moved from either of its operative positions part way toward neutral position effecting disengagement of the clutch and an engagement of the means for effecting the slow power driven movement of the change speed gearing, wherefore it is unnecessary to move the control member from operative position to neutral or central position when it is desired to effect a shifting of the change speed gearing.

Further and additional objects and advantages not hereinbefore referred to will become apparent hereinafter during the detailed description which is to follow of an embodiment of the invention.

Referring to the accompanying drawings,

Fig. 1 is a transverse sectional view through the head stock of a machine tool and is taken substantially on irregular line 1—1 of Fig. 2 looking in the direction of the arrows.

Fig. 2 is a developed view of the change speed gearing and driving mechanism for the work spindle of the head stock of the machine tool shown in Fig. 1.

Fig. 3 is a detail sectional view taken substantially on line 3—3 of Fig. 2 looking in the direction of the arrows.

Fig. 4 is a top plan view of the head stock of the machine tool with a portion of the cover broken away and with certain portions thereof extending downwardly from the cover shown in section, the section being taken substantially on line 4—4 of Fig. 1 looking in the direction of the arrows.

Fig. 5 is a fragmentary sectional view taken substantially on line 5—5 of Fig. 4 looking in the direction of the arrows.

Fig. 6 is a detached view of the slow power clutch mechanism and to operating means corresponding to the same parts illustrated in Fig. 4, but the parts being shown in a different position, i. e., with the slow power clutch mechanism engaged, at which time the manual control member is located intermediate neutral and forward position.

Fig. 7 is a view similar to ig. 6 but shows the relationship of the parts after the main drive clutch has been engaged for forward drive.

Fig. 8 is a view similar to Fig. 6 but showing the parts in the position they occupy when the manual control member is located intermediate neutral and reverse driving position, at which time the slow power clutch mechanism is engaged.

Fig. 9 is a view similar to Fig. 8 but showing the relationship of the parts when the main drive clutch is in the fully engaged position for reverse drive.

Fig. 10 is a view similar to Fig. 4 but illustrating a modified form of construction embodying the invention.

Fig. 11 is a view of the modified form taken along line 11—11 of Fig. 10 and is similar to Fig. 5, and Figs. 12, 13, 14 and 15 are detached views of the modified form of the slow power clutch mechanism and its operating means and are similar to Figs. 6, 7, 8 and 9, respectively.

In Fig. 1 a portion of a lathe is shown and which comprises a bed 20 at one end of which is located the head stock 21. A work spindle 22 is rotatably supported in the head stock and is adapted to be driven at a plurality of speeds by means of change speed gearing which will now be described. Referring to Fig. 2, wherein the change speed gearing is illustrated in a developed view, it will be seen that a pulley 23 is secured to the main drive shaft 24 and that said pulley can be connected to any suitable source of power. Freely rotatable on but fixed axially with respect to the drive shaft 24 in spaced relation are clutch members 25 and 26, while intermediate said clutch members there is a shiftable clutch member 27 that is splined to the shaft to rotate therewith and move axially thereof. The clutch formed by the members 25, 26 and 27 is arranged so that the shiftable clutch member 27 can be moved a short distance from neutral toward either the member 25 or the member 26 before it comes into clutching engagement with said members for a purpose later to be explained.

The clutch member 25 has formed thereon a gear 28 which meshes with an idler gear 29 that, in turn, meshes with a gear 30 fixed to a shaft 31. The clutch member 26 has formed thereon a gear 32 which constantly meshes with a gear 33 also fixed to the shaft 31. It will be seen that the shaft 31 can be driven by the shaft 24 in either the forward or reverse directions through the gearing just referred to and dependent upon the engagement of the main drive clutch.

A three-step gear cone formed of the gears 34, 35 and 36 is splined on the shaft 31 intermediate the gears 30 and 33 for rotation therewith but movable axially thereof and the gears 34, 35 and 36 are adapted to mesh, respectively, with gears 37, 38 and 39 fixed to a shaft 40 from which it will be noted that the shaft 40 can be driven at any one of three speeds in either the forward or reverse directions.

The gear 39 is constantly in mesh with a gear 41 formed on a sleeve 42 that is freely rotatable on the spindle 22 but held against axial movement thereon. The sleeve 42 is also provided with a gear 43 located adjacent the opposite end of the sleeve from the gear 41 and said gears 41 and 43 are adapted to mesh, respectively, with gears 44 and 45 of a rear two-step gear cone that is splined to a shaft 46 for rotation therewith and movement endwise thereof.

It will be seen that the shaft 46 can be driven at any one of six speeds in either the forward or reverse directions. The shaft 46 also has splined thereto a front two-step gear cone formed of the gears 47 and 48, with the gear 47 adapted to be brought into mesh with a gear 49 fixed to the spindle 22 and with the gear 48 adapted to be intermeshed with a gear 50 also fixed to the spindle, wherefore it will be seen that the spindle 22 can be driven from the main drive shaft 24 in any one of twelve speeds in either the forward or reverse directions. The shaft 31 can also be driven from the shaft 24 but at a considerably slower speed by mechanism which will now be described.

A beveled gear 51 is fixed to the shaft 24 and meshes with another beveled gear 52 fixed to a short shaft 53 that is rotatably supported in the head stock. The shaft 53 has fixed thereto intermediate its ends a worm 54 that meshes with a worm wheel 55 mounted on or formed integral with a clutch member 56 that is freely rotatable on the shaft 31 but held against axial movement. A shiftable clutch member 57 is splined to the shaft 31 for movement endwise thereof and for rotation therewith. The clutch members 56 and 57 constitute an auxiliary clutch and are provided on their adjacent faces with clutch teeth, wherefore when said teeth are engaged by shifting the clutch member 57 toward the clutch member 56 a relatively slow drive will be imparted from the shaft 24 to the shaft 31 through the gearing 51, 52, 54 and 55 and also to the change speed gearing of the transmission in the head stock.

In order to obtain the objects of the invention the main driving clutch on the shaft 24 and the auxiliary clutch formed of the members 56 and 57 on the shaft 31 are controlled by a control mechanism including a single manually operated control member, and said mechanism is so arranged that when said control member is in the neutral position both clutches are disengaged, but when it is in either of its operative positions only the main driving clutch is engaged, the auxiliary clutch at this time being disengaged. The control mechanism is also so constructed that when the control member is in a predetermined position intermediate neutral and either of its operative positions the main drive clutch will be disengaged but the auxiliary clutch will be engaged and thus a slow power drive will at this time be imparted to the change speed gearing, wherefore the shifting of the gear cones is facilitated.

A vertically extending shaft 58 is rotatably supported in a boss formed on the cover 59 of the head stock 21 and has fixed to its lower end a lever 60, the outer end of which is rounded and extends into a slot formed in a sleeve 61 that is slidably supported on a rod 62 carried by downward extensions formed on the underside of the cover 59. The sleeve 61 is provided with an integral downwardly extending yoke 63 that straddles the groove in the shiftable clutch member 27 of the main driving clutch, see Figs. 1 and 4, wherefore it will be seen that when the shaft 58 is rocked by moving the single control member or lever 64 fixed to the upper end of the shaft that said clutch member 27 can be moved into engagement with the clutch members 25 and 26 as the case may be for reverse or forward drive or can be shifted into a middle or neutral position, at which time the shiftable clutch member 27 is disengaged from both of the clutch members 25 and 26.

Secured to the shaft 58 immediately above the lever 60 is a double armed lever 65, the opposite ends of which are in the form of hooks 66 while inwardly of the opposite ends the lever 65 is provided with rounded abutting protuberances 67 for a purpose later to become apparent. A sleeve 68 slidable on a rod 69 carried by downwardly extending projections on the underside of the cover 59 is provided with an integral yoke 70 (see Fig. 5) that straddles the groove in the member 57 of the auxiliary clutch, wherefore it will be seen that movement of the sleeve 68 endwise on the rod 69 effects an endwise movement of the clutch member 57 to bring its clutch teeth into or out of engagement with the clutch teeth of the member 56. The sleeve 68 on its upper side is provided with a bearing pin on which are pivotally mounted lever arms 71 and 72 of a double toggle mechanism formed of the arms 71 and 72 and the arms 73 and 74 of bell crank levers which are pivotally mounted on a downwardly extending bearing pin 75 carried by the cover 59. The other arms of the bell crank levers 76 namely arms 76, project from the bearing pin 75 in opposite directions, as clearly shown in Figs. 4, 6, 7, 8 and 9. It will be understood, of course, that the adjacent ends of the arms 71 and 72 and 73 and 74 are pivotally connected together as is usual in toggle mechanisms.

The arms 73 and 74 adjacent to their pivotal connections to the arms 71 and 72 have secured thereto one end of extensible springs 78, the opposite end of which is secured to pins 79 carried by the cover of the head stock. The shiftable gear cones can be shifted by any desired means, but by way of example the following arrangement is illustrated herein.

The forward two-step gear cone on the shaft 46 and formed of the gears 47 and 48, is shifted by means of a shoe 80 straddling the gear 48 and swivelly carried by the outer end of an arm 81 that is fixed to the lower end of a rockable sleeve 82 rotatably mounted in a boss formed on the cover 59. The upper end of said sleeve 82 has secured thereto an operating lever 83.

The three-step gear cone on the shaft 31 formed of the gears 34, 35 and 36 is shifted by means of a shoe 84 that straddles the gear 35 and is carried by a slidable sleeve 85 mounted on a rod 86 arranged in suitable downwardly extending portions on the underside of the cover 59, as will be well understood. An arm 87 is fixed to the lower end of a vertically extending shaft 88 arranged within the sleeve 82 and rotatable relative thereto, and said arm 87 extends into a slot formed on the sleeve 85, wherefore when the shaft 88 is rocked the arm 87 will impart sliding movement to the sleeve 85 to shift the three-step gear cone. An operating lever 89 is secured to the upper end of shaft 88 and extends toward the forward side of the machine, as is clearly shown in Figs. 1 and 4.

The rear two-step gear cone on the shaft 46 may be shifted similarly to the front two-step gear cone by shifting mechanism operated by an operating lever 90, as shown in Fig. 4.

When the main control lever 64 is in the full line position N of Fig. 4 the main driving clutch on the shaft 24 and the auxiliary clutch on the shaft 31 formed of the clutch members 56 and 57 are both in the disengaged or neutral position and the parts of the control mechanism for said clutches are in the position indicated in Fig. 4. It will be noted that at this time the outer ends of the arms 76 of the bell crank levers which form part of the toggle mechanism connected to the sleeve 68 are in engagement with the rounded protuberances 67 on the double lever arm 65. When the double lever arm 65 is in the position shown in Fig. 4 the springs 78, acting on the arms 73 and 74 of the toggle mechanism, positions said arms and consequently the arms 71 and 72, as shown in Fig. 4, at which time, of course, the sleeve 68 and the clutch member 57 are moved toward the right, as viewed in the drawings, and the teeth of said clutch member and clutch member 56 are disengaged.

Assuming that a work piece has been positioned on the work spindle 22, the machine now being at rest, and it is desired to shift the gear cones to obtain a certain spindle speed and commence the operation of the machine, the operator moves the main control lever 68 from position N, i. e., neutral position of Fig. 4, to the dash line position C of Fig. 4. This movement of the main control lever 68 rocks the lever 60 in a clockwise direction to cause a movement of the shiftable clutch member 27 toward the clutch member 26, but it will be remembered that an overthrow movement is arranged for in the main driving clutch, such that the movable clutch member 27 at this time will not be brought into driving engagement with the clutch member 26. The said movement of the main control lever 68 also effects a rocking movement of the double lever arm 65 from the position shown in Fig. 4 to the position shown in Fig. 6. During this movement of the double lever arm 65 the arm 76 of the upper bell crank of the toggle mechanism has been moved by the lower protuberance 67 until the arms 73 and 71 of the upper toggle mechanism lie in straight alignment with each other as indicated in Fig. 6, at which time the lower hook 66 of the arm 65 has passed behind or straddles the end of the upper arm 76. This positioning of the arms 71 and 73 of the upper toggle causes the sleeve 68 to be moved toward the left as viewed in the drawings, to thus effect an engagement of the clutch teeth of the clutch member 57 with the clutch teeth on the clutch member 26 as clearly indicated in Fig. 6, at which time a slow power drive will be imparted to the change speed gearing through the gearing 51, 52, 54 and 55. It will be understood that the movement toward the left of the sleeve 68 upon the straightening of the toggle arms 71 and 73 effects a corresponding straightening of the lower toggle arms 72 and 74, since said arms are connected to the sleeve 68, wherefore both springs 78 are equally extended. At this time, as previously stated, a slow power drive is being imparted to the change speed gearing such that when the operator shifts the gear cones by movement of the levers 83, 89 or 90, the teeth of the gears will be readily intermeshed without clashing.

After the gearing has been shifted by movement of the levers 83, 89 or 90 the operator then moves the main control lever 68 from position C of Fig. 4 to dash line position F of said figure, which movement effects a further clockwise rocking movement to the double lever arm 65 that is from the position shown in Fig. 6 to the position shown in Fig. 7. This further movement of the double lever arm 65 results in a further clockwise rocking movement to the upper bell crank lever of the toggle mechanism, such that the arms 71 and 73 are moved out of alignment and into an angularly disposed position opposite to their positions shown in Fig. 4. This movement of the arms 71 and 73 of the toggle causes the sleeve 68 to be positively moved toward the right, as viewed in the drawings, to effect a disengagement of the clutch teeth of the clutch members 56 and 57, it being understood that the spring 78 connected to the arm 74 of the lower toggle causes the arms 72 and 74 of said toggle to move into their normal position, i. e., the position of Fig. 4 and to lie directly under the arms 71 and 73. The parts are so arranged that the disengagement of the teeth of the clutch members 56 and 57 takes place just prior to the main control lever 68 reaching position F, and that the further slight movement necessary to bring control lever 68 completely into position F results in the lever 60 having been rocked sufficiently far in the clockwise direction to bring the clutch member 27 into driving engagement with the clutch member 26, whereupon the change speed gearing will be driven at a normal driving rate and the spindle will be rotated at the newly selected speed.

When it is desired to change the speed of the spindle 22 the operator moves the main control lever 68 from position F of Fig. 4 to position C, and such movement first results in a disengagement of the main driving clutch and then in an engagement of the auxiliary clutch members 56 and 57, that is the parts of the control mechanism move from the position indicated in Fig. 7 to the position indicated in Fig. 6.

It will now be understood that at this time the change speed gearing is slowly rotating and the operator can shift the gear cones to obtain the next speed by suitable movement of the levers 83, 89 or 90, and that when the gearing has been shifted the main control lever 64 is then moved from position C to position F to disengage the auxiliary clutch and reengage the main driving clutch, such movement again changing the parts of the control mechanism from the position shown in Fig. 6 to the position shown in Fig. 7.

When it is desired to stop the operation of the machine, such as when the work piece is completed and a new work piece is to be loaded on the work spindle, the operator moves the main control lever 64 from position F, through position C, to position N of Fig. 4, and such movement first disengages the main driving clutch, momentarily engages the auxiliary clutch, and then disengages said auxiliary clutch, at which time the change speed gearing and the spindle are idle, the parts of the control mechanism having moved momentarily from position shown in Fig. 7 to the position shown in Fig. 6 and then to the normal or neutral position of Fig. 4. Of course, if the operator so desires he may allow the main control lever 64 to remain in position C sufficiently long to enable him to move the front two-step gear cone on the shaft 46 to an intermediate or inoperative position with respect to the gears 49 and 50 on the spindle, after which he will continue the movement of the main control lever to position N. The manner in which the operation of the machine can again be initiated after the new work piece has been loaded on the work spindle will be fully understood from the explanation hereinbefore given.

If the spindle is to be operated in the reverse direction for any purpose, it will be understood that the main control lever 64 can be moved from position N of Fig. 4 to the dash line position CR of said figure to effect an engagement of the auxiliary clutch to produce the slow drive to the gearing and such movement of the main control lever brings the parts of the control mechanism from the position shown in Fig. 4 to the position shown in Fig. 8. After this movement of the main control lever 64 to position CR the gearing can be suitably shifted by the levers 83, 89 or 90, and then the main control lever 64 moved from position CR to position R to first disengage the auxiliary clutch and then engage the main driving clutch in the reverse direction, it being understood that the parts of the control mechanism during this further movement of the main control lever move from the position shown in Fig. 8 to the position shown in Fig. 9. It will further be understood that the operation of the machine and the manner in which the main driving clutch and the auxiliary clutch are controlled is identical with the control of these clutches for forward operation of the machine as above explained and need not be repeated herein.

In Figs. 10 to 15 inclusive there is illustrated a modified form of control mechanism for the main driving clutch and for the auxiliary clutch, but with the exception of the parts of the control mechanism the remainder of the machine is identical and consequently the same reference characters will be employed in describing this modified construction. The main control lever 64 is connected to the upper end of a shaft 91 similar to the shaft 58 previously described, and this shaft has secured to its lower end in place of the lever arm 60 and the double lever arm 65 a three-armed lever having a short arm 92 that is operatively associated with the main driving clutch and two long arms 93 and 94 which are operatively associated with the auxiliary clutch on the shaft 31 as will now be explained.

The outer end of the arm 93 of the three-armed lever is forked and straddles the outer end of an arm 95, the opposite end of which is pivotally connected to a sleeve later to be referred to and corresponding in function to the sleeve 68 previously described. The end of the arm 95 that is straddled by the forked end of the arm 93 is provided with an elongated slot 96, while the arm 93 carries a pin which passes through said slot. The arm 94 of the three-armed lever similarly has its outer end in the form of a fork straddling one end of an arm 97 which end of said arm is provided with an elongated slot 98 through which a pin extends that is carried by the end of the arm 94. The opposite end of the arm 97 is pivotally connected to one end of a lever 99 that is pivotally mounted intermediate its ends upon a bearing pin carried by the cover plate 58, as clearly indicated in Figs. 10 and 11. The opposite end of the lever 99 is rounded as indicated at 100 and is at times in contact with the end of an abutment arm 101 which is fixed to the rod 102 that is slidably mounted in supporting portions extending downwardly from the cover 58.

As previously stated, the arm 95 is pivotally connected to a sleeve 103 which is also fixed to the rod 102 and a suitable spring 104 is mounted on the rod 102 intermediate the sleeve 103 and the left hand downwardly extending portion which slidably supports the rod. The sleeve 103 is provided with an integral yoke that straddles the groove in the clutch member 57, from which it will be seen that endwise movement of the sleeve and rod 102 causes an endwise movement of said clutch member 57, the movement of the clutch member 57 toward the clutch member 56 being against the action of the spring 104 which tends normally to move said clutch member away from the clutch member 56. In effect the arms 93 and 95 and 94 and 97 form toggles for a purpose which will now become clear.

When the main control lever is in neutral position, i. e., full line position N of Fig. 10 the parts of the clutch control mechanism are in the position indicated in said figure, at which time the main driving clutch and the auxiliary clutch are both disengaged. A movement of the main control lever 64 from full line position N to dash line position C of Fig. 10 causes a clockwise movement of the three-armed lever on the shaft 91 and results in a movement of the parts of the clutch control mechanism from the position shown in Fig. 10 to the position shown in Fig. 12. At this time the arm 92 of the three-armed lever has moved the shiftable clutch member 27 partially toward the clutch member 26 but without effecting an engagement therewith. This clockwise rocking movement of the three-armed lever brings the arms 93 and 95 into alignment, as indicated in Fig. 12, and causes an anticlockwise swinging movement of the arm 97. The movement of the arms 93 and 95 into alignment causes a movement of the sleeve 103 and rod 102 toward the left, as viewed in the drawings, against the action of the spring 104 and brings the clutch teeth on the clutch members 56 and 57 into engagement, at which time a slow power drive is being imparted to the change speed gearing in the head and the gears thereof can be shifted without clashing to obtain any desired speed. When the gears have been shifted the main control lever 64 is moved from dash line position C to dash line position F of Fig. 10, and such movement effects a further clockwise rotation of the three-armed lever carried by the shaft 91. This further rotation of the three-armed lever results in the arms 95 and 93 being moved out of alignment and to the position shown in Fig. 13 and also results in a further anticlockwise movement of the arm 97 about its pivotal connection to the lever 99. The movement of the arms 95 and 93 to the angular position of Fig. 13 allows the spring 104 to force the sleeve 103, rod 102 and clutch member 57 toward the right to disengage the teeth of said member from the teeth of the clutch member 56. This movement of the three-armed lever first effects a disengagement of the auxiliary clutch, as just stated, and then an engagement of the main driving clutch, the shiftable clutch member 27 of which has been moved further toward the clutch member 26 by the arm 92 of the three-armed lever until the driving relationship is established, at which time the change speed gearing and the spindle will be rotating at the desired and selected speed.

It will be understood that when it is desired to change the speed of the spindle the operator will move the main control lever 64 from position F to position C to effect first a disengagement of the main driving clutch and then an engagement of the auxiliary clutch, such movement of the main control lever moving the parts of the control mechanism from the position shown in Fig. 13 to the position shown in Fig. 12. When this has been accomplished the change speed gearing may be shifted without clashing and then the main control lever moved from position C to position F to first disengage the auxiliary clutch and engage the main driving clutch, such movement again moving the parts of the control mechanism from the position shown in Fig. 12 to the position shown in Fig. 13.

When it is desired to stop the operation of the machine the operator, as in the first described form, moves the main control lever F through position C to position N, such movement resulting in changing the position of the parts of the control mechanism from that shown in Fig. 13 momentarily to that shown in Fig. 12 and then to that shown in Fig. 10. When it is desired to operate the machine in the reverse direction the operator will move the main control lever 64 from position N to dash line position CR of Fig. 10 and such movement effects an anticlockwise rotation of the three-armed lever from the position shown in Fig. 10 to the position shown in Fig. 14. This movement of the three-armed lever moves the shiftable clutch member 27 toward the clutch member 25 but not into driving engagement therewith. This movement of the three-armed lever also brings the arms 94 and 97 into alignment, as indicated in Fig. 14, with the result that the lever 97 is rocked about its intermediate pivot point and causes its end 100 to move the abutment arm 101 and rod 102 and sleeve 103 toward the left against the action of the spring 104 and result in an engagement of the auxiliary clutch on the shaft 31. At this time the anticlockwise movement of the three-armed lever merely causes, through the arm 93, a rocking movement of the arm 95 about its pivotal connection to the sleeve 103, it being understood that the previously referred to movement of the sleeve 103 toward the left merely causes the pin carried by the outer end of the arm 93 to move outwardly in the slot 96. The change speed gearing is now being slowly rotated so that the operator can readily effect a shifting of the gearing to the desired position, and after this has been done the main control lever 64 is moved from position CR to dash line position R of Fig. 10, and such movement causes a further anticlockwise rotation of the three-armed lever, resulting in first moving the arms 94 and 97 out of alignment and into angular relationship as shown in Fig. 15, with the result that the lever 99 is rocked about its pivot in a direction away from the abutment arm 101, such that the spring 104 is free to act to move the sleeve 103 and rod 102 toward the right to effect a disengagement of the auxiliary clutch. This further movement of the three-armed lever immediately after the auxiliary clutch has been disengaged causes the shiftable clutch member 27 to be brought into driving relationship with the clutch member 25 and at this time the machine will be operating at the selected speed in the reverse direction. The manner in which the speeds may be changed, and the operation of the machine stopped will be understood from the previous description.

It will be understood that although the auxiliary clutch has been illustrated and described herein as of the positive type that friction clutches or other types of clutches could be employed equally as well.

From the foregoing description it will have been seen that the present invention embodies a control mechanism for the main driving clutch and the auxiliary clutch which is so constructed that the single manually operated control member or lever thereof has the standard or conventional positions when the main driving clutch is engaged for forward or reverse drive or when it is in disengaged or neutral position, while said control member or lever when the auxiliary clutch is engaged will lie intermediate the neutral position and the forward or reverse positions, thus facilitating the operation of the machine, in that the operator merely has to move said control member or lever from forward or reverse position partly toward neutral position to effect a disengagement of the main driving clutch and an engagement of the auxiliary clutch so that the change speed gearing can be shifted readily and without clashing.

It will also be noted that in the present construction when it is desired to stop the rotation of the spindle and the operation of the machine the control lever in moving from forward or reverse positions to neutral position must pass through the position where the auxiliary clutch is momentarily engaged. This momentary engagement of the auxiliary clutch acts effectively as a brake, due to the worm and worm wheel drive from the main driving spindle to slow down the rotation of the change speed gearing and the spindle, such that when the control lever reaches neutral position there will be no further coasting of the parts.

Although several preferred embodiments of the invention have been illustrated and described herein, it will be understood that the invention is susceptible of various modifications and adaptations within the scope of the appended claims.

Having thus described my invention I claim:

1. In a machine tool having a part to be moved and a power source, change speed gearing for varying the rate of movement of said part, a main clutch for connecting said change speed gearing, and said power source for imparting a plurality of different rates of movement to said part, an auxiliary clutch for connecting said power source to said change speed gearing to impart to the latter a relatively slow rate of movement to facilitate the shifting thereof, and mechanism for engaging and disengaging said clutches and including a single control member movable from a neutral position wherein both clutches are disengaged first to a position wherein the auxiliary clutch is engaged while the main clutch remains disengaged and then to a position wherein the main clutch is engaged and the auxiliary clutch disengaged.

2. In a machine tool having a part to be moved and a power source, change speed gearing for varying the rate of movement of said part, a main clutch for connecting said change speed gearing and said power source for imparting a plurality of different rates of movement to said part in either the forward or reverse directions, an auxiliary clutch for connecting said power source to said change speed gearing to impart to the latter a relatively slow rate of movement to facilitate the shifting thereof, and mechanism for engaging and disengaging said clutches and comprising a single control member, and means operatively associating said control member with said clutches such that movement of said member to a position intermediate the forward or reverse positions and neutral position effects an engagement of the auxiliary clutch and disengagement of the main clutch, while the positioning of said member in either the forward or reverse position effects a disengagement of the auxiliary clutch and an engagement of the main clutch, both clutches being disengaged when said member is in the neutral position.

3. In a machine tool having a part to be moved and a power source, change speed gearing for varying the rate of movement of said part, a main clutch for connecting said change speed gearing and said power source for imparting a plurality of different rates of movement to said part in either the forward or reverse direction, an auxiliary clutch for connecting said power source to said change speed gearing to impart to the latter a relatively slow rate of movement to facilitate the shifting thereof, and mechanism for engaging and disengaging said clutches and including a single control member, and operative connections between said member and said clutches such that movement of said control member from neutral position wherein both clutches are disengaged toward either forward or reverse positions wherein the main driving clutch is engaged first effects an engagement of the auxiliary clutch while the main clutch remains disengaged and then a disengagement of the auxiliary clutch and an engagement of the main clutch.

4. In a machine tool having a part to be moved and a power source, change speed gearing for varying the rate of movement of said part, a main clutch for connecting said change speed gearing and said power source for imparting a plurality of different rates of movement to said part, an auxiliary clutch for connecting said power source to said change speed gearing to impart to the latter a relatively slow rate of movement to facilitate the shifting thereof, and mechanism for engaging and disengaging said clutches and including a single control member, and operative connections between said member and said clutches including a toggle interconnecting said auxiliary clutch and said member such that movement of said member from neutral position wherein both clutches are disengaged to an operative position wherein the main clutch is engaged first operates through said toggle to engage said auxiliary clutch while the main clutch remains disengaged and then to disengage the auxiliary clutch prior to the engagement of the main clutch.

5. In a machine tool having a part to be moved, a clutch for connecting said part to a power source, a second clutch for connecting said part to a power source, and mechanism for effecting engagement and disengagement of said clutches and including a single control member, a toggle connected to one of said clutches, and means movable by said member and independent of said toggle for actuating the latter upon predetermined movements of said member to effect engagement and disengagement of said one clutch.

6. In a machine tool having a part to be moved, a clutch for connecting said part to a power source, a second clutch for connecting said part to a power source and mechanism for effecting engagement and disengagement of said clutches and including a single control member, a pair of means movable by said member and one of which has a direct operative connection with one of said clutches, a toggle connected to said other clutch, said other means being independent of said toggle but operatively associated therewith such that predetermined movements of said member actuates said toggle to effect engagement and disengagement of said other clutch.

7. In a machine tool having a part to be moved, a clutch for connecting said part to a power source, a second clutch for connecting said part to a power source, and mechanism for effecting engagement and disengagement of said clutches and including a single control member, a pair of means movable thereby and one of which has a direct operative connection with one of said clutches, a toggle connected to said other clutch, said other means being independent of said toggle but operatively associated therewith such that predetermined movements of said member actuates said toggle to effect engagement and disengagement of said other clutch, said pair of means being so arranged that both of said clutches can be disengaged at one time but only one can be engaged at a time.

8. In a machine tool having a part to be moved, a clutch for connecting said part to a power source, a second clutch for connecting said part to a power source, and mechanism for effecting engagement and disengagement of said clutches and including a rockable shaft having fixed thereto a single armed lever operatively associated with one of said clutches, and a second lever also mounted on said shaft and provided adjacent its outer end with a hooked portion and an abutting protuberance, a toggle mechanism connected to said other clutch and including a bell crank lever, one of the arms of said bell crank lever being operatively associated with the crank lever being operatively associated with the hooked portion and protuberance of said second lever, and a single means for rocking said shaft to effect engagement and disengagement of said clutches.

9. In a machine tool having a part to be moved, a clutch for connecting said part to a power source, a second clutch for connecting said part to a power source, and mechanism for effecting engagement and disengagement of said clutches and including a rockable shaft provided with a single armed lever having a direct operative connection with one of said clutches and also provided with a double armed lever, the opposite ends of said double armed lever having hooked portions and abutting protuberances, a pair of toggles operatively associated with said other clutch and each including a bell crank lever, said bell crank levers having arms operatively associated with the opposite ends respectively of said double armed lever, and a single means for rocking said shaft to effect engagement or disengagement of said clutches.

10. In a machine tool having a part to be moved, a clutch for connecting said part to a power source, a second clutch for connecting said part to a power source, and mechanism for effecting an engagement and disengagement of said clutches and including a rockable shaft having fixed thereto a three armed lever, one of the arms of said lever having a direct operative connection with one of said clutches, a pair of levers operatively associated with said other clutch and with said other arms of said three armed lever and forming with said other arms a pair of toggles, and a single means for rocking said shaft to effect engagement and disengagement of said clutches.

11. In a machine tool having a part to be moved and a power source, a main clutch for connecting said part to said power source, an auxiliary clutch for connecting said part to said power source, and a single control member for engaging and disengaging said clutches and movable from a neutral position wherein both clutches are disengaged first to a position wherein the auxiliary clutch is engaged while the main clutch remains disengaged and then to a position wherein the main clutch is engaged and the auxiliary clutch disengaged.

12. In a machine tool having a part to be moved and a power source, a main clutch for connecting said part to said power source to move the same in either a forward or reverse direction, an auxiliary clutch for connecting said part to said power source, a single control member for engaging and disengaging said clutches, and means operatively associating said control member with said clutches such that movement of said member to a position intermediate the forward or reverse positions and neutral position effects an engagement of the auxiliary clutch and disengagement of the main clutch while the positioning of said member in either the forward or reverse position effects a disengagement of the auxiliary clutch and an engagement of the main clutch, both of said clutches being disengaged when said member is in the neutral position.

JOHN J. N. VAN HAMERSVELD.